United States Patent [19]

Nugent

[11] Patent Number: 4,536,286
[45] Date of Patent: * Aug. 20, 1985

[54] MOBILE WASTE WATER AND SLUDGE TREATMENT FOR HAZARDOUS AND NON-HAZARDOUS FLUIDS

[75] Inventor: James E. Nugent, Lafayette, La.

[73] Assignee: Water & Industrial Waste Laboratories, Inc., Lafayette, La.

[*] Notice: The portion of the term of this patent subsequent to Jul. 2, 2002 has been disclaimed.

[21] Appl. No.: 559,964

[22] Filed: Dec. 9, 1983

Related U.S. Application Data

[63] Continuation-in-part of Ser. No. 544,520, Oct. 24, 1983, which is a continuation of Ser. No. 357,789, Mar. 12, 1982, which is a continuation of Ser. No. 119,815, Feb. 8, 1980, abandoned.

[51] Int. Cl.³ .......................... C02F 1/52; B01D 21/08
[52] U.S. Cl. .................... 210/202; 175/206; 210/205; 210/208; 210/241; 210/521; 210/535
[58] Field of Search ............... 175/66, 206; 210/702, 210/714, 738, 195.1, 199, 205, 207, 208, 219, 237, 249, 260, 241, 541, 542, 532.1, 521, 534, 535

[56] References Cited

U.S. PATENT DOCUMENTS

| | | | |
|---|---|---|---|
| 2,110,721 | 3/1938 | Fischer | 210/738 |
| 2,429,316 | 10/1947 | Green | 210/208 |
| 3,306,449 | 2/1967 | Minegishi | 210/207 |
| 3,353,676 | 11/1967 | Hirsch | 210/208 |
| 3,487,017 | 12/1969 | Thorn et al. | 210/208 |
| 3,764,011 | 10/1973 | Owens | 210/237 |
| 3,951,806 | 4/1976 | Young | 210/208 |
| 4,054,514 | 10/1977 | Ohmann | 210/208 |
| 4,069,143 | 1/1978 | Friesenborg et al. | 210/532.1 |
| 4,142,970 | 3/1979 | von Hagel | 210/738 |
| 4,366,063 | 12/1982 | O'Connor | 210/241 |
| 4,367,145 | 1/1983 | Simpson et al. | 210/241 |

Primary Examiner—Peter Hruskoci
Attorney, Agent, or Firm—Charles C. Garvey

[57] ABSTRACT

A packaged, transportable waste treatment system for hazardous and non-hazardous wastes comprises a pair of mixing tanks having a flow inlet at the lower bottom central portion of the tanks, the flow inlet providing an injection conduit which proceeds vertically a distance into one of the tanks. A floc concentration tube is provided with an inner bore, the tube being vertically mounted in the tank about the injection conduit with the tube having a lower fluid inlet and an upper fluid outlet, the fluid inlet being in communication with the tank by means of a plurality of perforations in the tube at the fluid inlet adjacent the bottom of the tank. A rotatable propeller shaft having a mixing propeller mounted thereon is attached to the tank structure, the shaft being mounted at least in the tube bore above the injection conduit with the propeller being between the lower fluid inlet and the upper outlet immediately adjacent the outlet of the injection conduit. A cylindrical shroud baffle having a diameter greater than the diameter of the tube is mounted within the tank and the upper fluid outlet and surrounding the fluid outlet of the tube. The baffle provides upper and lower edge portions projecting respectively a distance above and below the fluid outlet. The tube provides a floc concentration chamber which surrounds the point of injection of the waste stream entering the tank together with chemicals which are injected to enhance formation of floc in a manner which enhances recirculation and therefore floc buildup. A second mixing tank further enhances floc buildup prior to settling.

1 Claim, 5 Drawing Figures

MOBILE WASTE WATER AND SLUDGE TREATMENT FOR HAZARDOUS AND NON-HAZARDOUS FLUIDS

REFERENCE TO RELATED APPLICATION

This is a continuation in part of U.S. Ser. No. 544,520 filed Oct. 24, 1983 entitled "Reserve Pit Waste Treatment System" which is a continuation of U.S. Ser. No. 357,789 filed Mar. 12, 1982, which is a continuation of U.S. Ser. No. 119,815 filed Feb. 8, 1980 entitled "Reserve Pit Waste Treatment System" which is now abandoned.

BACKGROUND OF THE INVENTION

The present invention relates to waste water and sludge treatment systems and more particularly relates to hazardous and non-hazardous waste lagoons in chemical manufacturing, food processing, mining and in the exploration and drilling of oil and gas wells, wherein the water cleanup and sludge reduction are performed simultaneously.

BACKGROUND ART

In the process of manufacturing chemicals, processing foods and oil and gas drilling operations, it has been a standard practice to construct earthen lagoons or pits for storing process waste water containing anywhere from 1% to 15% solids. These lagoons require a large land area of from 1 to 100 acres depending on water usage in the plant operations, the percentage of solids and the settability of the solids. Lagoons have been constructed that have allowed the contaminated water and sludges to leach into the water bearing sands, and have required valuable land area. Lagoons containing the maximum allowable volume of waste have to be disposed of properly either by underground injection or trucked to approved commercial disposal sites. This method of disposal has presented the problems that have proven to be very costly, has created a concentration of wastes that has been objectional to the public and adjoining land owners. Thus, there is a need for a method of continuously or periodically disposing of the waste streams and sludges and/or greatly reducing the amount of sludges that have to be hauled off-site to commercial disposers. There is a need for a transportable waste treatment unit which permits the generator of waste to reduce the land area required to construct lagoons, and to reduce the volume of sludges hauled to off-site commercial disposers. Such a unit must be completely mobile and be capable of treating relatively high volumes (e.g., 100 to 300 gallons per minute) of waste water. It must be self-contained having chemical storage, chemical pumps, sludge pumps, water pumps, laboratory, centrifuge, conveyors, etc. It must be self-contained so that it can be moved readily, having weight, height and width sizes for highway travel. It must be designed to be placed into full operation after delivery in a matter of a few hours. It must be capable of being unloaded without the use of cranes or special equipment. It must further be effective in treating hazardous, non-hazardous and chemical waste.

GENERAL DISCUSSION OF THE PRESENT INVENTION

The present invention solves these prior art problems and shortcomings in a simple and inexpensive manner. The present invention provides a waste water treatment system where the water phase of the lagoons or pits are pumped to an improved mobile treatment unit, the treated water discharged to a stream, the solids removed and reduced by dewatering of up to 75%. The present invention provides a "split" mixing apparatus having two mixing tanks. The first mixing tank has a flow inlet at the bottom central portion adapted to receive a fluid stream into the tank where the water is charged with a negative ion usually aluminum sulphate, cationic polymers or a combination of both, for example. A floc concentration tube provides an inner bore, the tube being vertically in the tank. The tube has a lower fluid inlet and an upper fluid outlet with the fluid inlet communicating with the remainders of the tank at the lower portion of the tube. A plurality of perforations are provided to allow the tube at the fluid inlet to communicate with fluids in the tank.

A rotatable propeller shaft is supported above the tank and provides a mixing propeller mountable within the tube. The speed of the propeller shaft is controlled by a variable pitch pulley attached to a drive motor and a gear reducer attached to the propeller shaft.

A shroud baffle mounted within the tank at the upper fluid outlet surrounds the outlet of the tube, the baffle providing upper and lower edge portions projecting respectively a distance above and below the fluid outlet. The construction of the mixing apparatus provides a desirable recirculation rate of a minimum of three and a maximum of seven.

The mixer operates with an overall treatment unit providing an inlet line which is equipped with, for example, flow meters to measure the water pumped to the unit. The water is blended proportionally with feed chemicals pumped by, for example, electronic metering pumps which are furnished with a record of the fluids being treated.

Water is pulled into the mixing tank through the flocculator blades of the propeller where the floc particles are further mixed. The stream then flows over the top of the draft tube and is pulled down between the draft tube and the baffle and re-enters the draft tube repeating the process on the order of a recirculation of three to seven times.

The effluent from the first mixing tank flows downward through the draft tube to the flow inlet at the bottom central portion of the second mixing tank. A positive charge of anionic polymer is applied at this location to attract the minus charges in the fluid coming from the first mixing tank. Also, located at the inlet of the bottom central portion of the second mixing tank is a flow meter. This flow meter measures the flow of centrate from the centrifuge. The centrate (fluid) from the dewatering device has positive charges. The reuse of this water is two-fold in that it carries a plus charge that is required to aid in flocculation of the fluid in the second tank plus the centrate carries 0.5% to 1% solids plus all chemical compounds found in the sludge prior to dewatering. This fluid in the second tank flows upward in the cylinder and is stirred at a reduced speed, determined by the operator, to allow the negatively charge floc to attract and grow in size and density without shearing or breaking of the floc particles. Excess water from the second mixing tank flows through a line to a treatment tank weir-trough where additional chemicals can be added as desired. The weir-trough is so designed that the floc is evenly distributed over the entire width of the primary settling tank. The primary settling tank provides sloped bottom portions which are divided into two sections. A baffle forms the division between the subtank sections.

The placement of the baffle and the design of the tank as hereinafter described creates a desirable rolling action of the floc to further enhance floc size and an exemplary deposition of 60% to 70% of the floc as sludge. Sludge is removed by the use of a sludge blow-off valve which is installed on the bottom center side of the settling tank. The sludge blow-off is automatically accomplished by a sludge blow-off timer that is preset in proportion to flow entering the treatment unit.

Water leaving the primary settling tank passes through wooden baffles into the secondary settling tank which has a rentention time, for example, 20 minutes, where an exemplary additional 15% to 20% of the solids are settled. The secondary settling tank is designed with a sloped bottom for sludge removal identical to the primary settling tank.

Water leaving the secondary settling tank passes through wooden baffles (optional) into the final settling tank which has a retention time of 10 to 15 minutes and the remaining 5% or less solids are removed. The final settling tank is designed with a sloping bottom for sludge removal identical to the primary and secondary settling tank.

A sludge removal system consists of a plurality of connected headers spaced evenly over the bottom of the tank with a drain sludge collection line which can be either manually or automatically operated.

A manually operated oil skimmer is installed in the primary and secondary clarifier for oil removal where the oil can be drawn off into a temporary storage tank.

The oil is drawn off by a manual means and containerized. The clear water can be pumped into the inlet flow line of the unit for further processing and removal of solids, metals, and chemical oxygen demand.

The sludge blow-off from the primary and secondary treatment zones are pumped to the sludge thickener before the water removal takes place. Water removed from this sludge is returned to the inlet flow line to the unit.

The water leaving the final settling tank overflows over an adjustable straight edge weir and falls into the effluent trough then through the effluent line. The height of the effluent weir and trough produce sufficient "head" to allow the water to be discharged to the influent trough of the sand and gravel filters. The sludge blow-off from the primary, secondary, and final settling tanks is blown-down to a sludge box. The pumps on the sludge box pumps the sludge to the centrifuge. The sludge solids have an exemplary range of from 5% to 25% solids and contains from 95% to 75% liquids. The centrifuge further dewaters the sludge solids and reduces the volume of raw sludge to a dried cake. The volume of sludge is, for example, reduced from 100% down to 25% as a dried cake. The water extracted from the sludge contains, for example, 0.5% solids and is returned to the treatment unit for further treatment. The dried cake may be hauled off for land filling if a non-hazardous classification is given it. It may be hauled and disposed of by commercial disposers or it may be chemically fixed by the "pug mill" and with the additional sodium silicate and cement to form a hard cement like material that prevents most organics from leaching out and causing further contamination.

The effluent from the water treatment unit flows by gravity to the influent trough of the polishing filters for suspended solids removal. The polishing filters play a very necessary role for waters that must be injected underground since the fine suspended solids tend to plug the underground sands and thereby creates a back pressure on the injection pumps and eventually the solids will plug the sands completely and injection into the sands will cease.

The water from the treatment unit must also be filtered to remove suspended solids prior to the activated carbon filters since the use of carbon filters as a filter media to remove large quantities of suspended materials is not a cost effective treatment technique. The polishing filters are also necessary in the treatment operation when the Reverse Osmosis Unit is in operation. Pre-filtering is required to prevent plugging of the membranes and thereby decreasing the rejection rate of the R.O. Unit. The water from the polishing filters is pumped to the influent trough of the activated carbon filters. Activated carbon is required to achieve removal of unwanted pollutants. The flow rates through the activated carbon filters are rated at one to 1 gpm per sq. ft. This invention due to its mobility and the capability of placing the equipment into operation within a matter of hours and also the fact that generators of waste water do not have to invest in costly permanent installation of waste water and sludge.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 4 is a sectional front view of the second chemical mixer portion of the preferred embodiment of the apparatus of the present invention; and FIG. 5 is a detail of the sludge tank portion of the preferred embodiment of the apparatus of the present invention.

DETAILED DESCRIPTION OF THE PREFERRED EMBODIMENT

Figure 1:
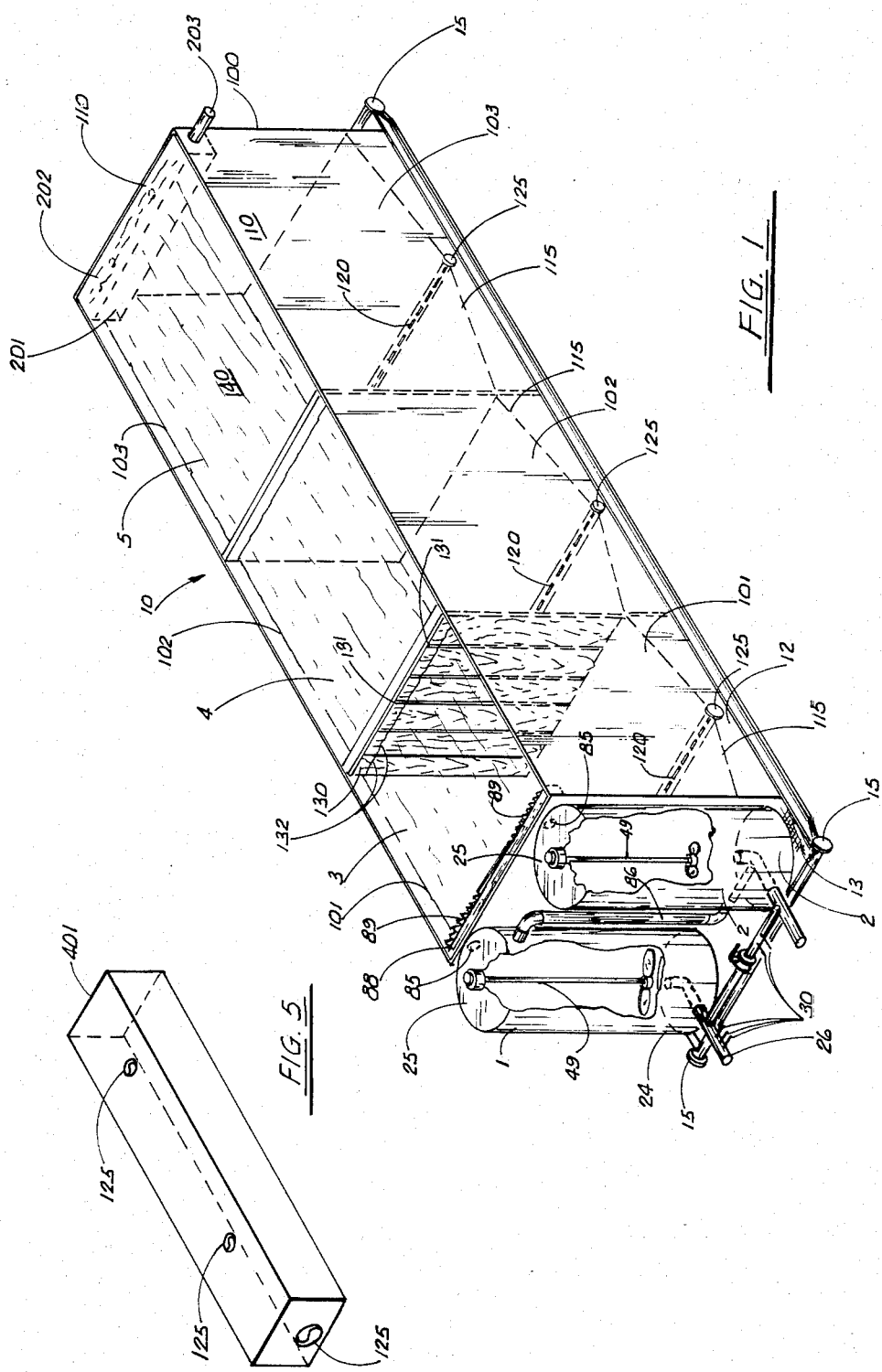
FIG. 1 is a perspective view of the preferred embodiment of the apparatus of the present invention.

FIG. 1 best shows the preferred embodiment of the present invention designated generally by the numeral 10. In FIG. 1 there is provided a structural sled 12 which could be, for example, welded steel construction having a plate steel or steel grating deck 13 portion. The skid 14 upon which the apparatus is attached to provide for loading and unloading of the apparatus. Lifting or pulling eyes 15 are fastened to the skid for the slings and cables to lift the apparatus for loading or unloading on the job site. Skid 14 serves also as a foundation for the apparatus.

Mounted upon sled 12 are mixing tanks 1 and 2 to provide for split treatment of the fluid and the primary 3, secondary 4, final settling tanks 5 having primary subsection 101, secondary 102 and final 103 subsection.

Tanks 1 and 2 are preferably cylindrical having a cylindrical side wall 22, flat bottom 24 and top 25 portions. A flow inlet 26 is provided at the lower portions of tank 1, being mounted, for example, upon the deck 13 of sled 12. Flow inlet 26 can be any conventional piping assembly, as shown, and is equipped with a plurality of chemical injection lines 30. Injection lines 30 are provided before fluid is transmitted into tank 1 and after leaving tank 1 but before entering tank 2. Typically, flocculation agents will be injected at line 30 to the waste stream being added to mixer 1. Inlet 26 connects with conduit 35 with a bore 66 which forms a discharge 36 into tube 40.

Figure 2:
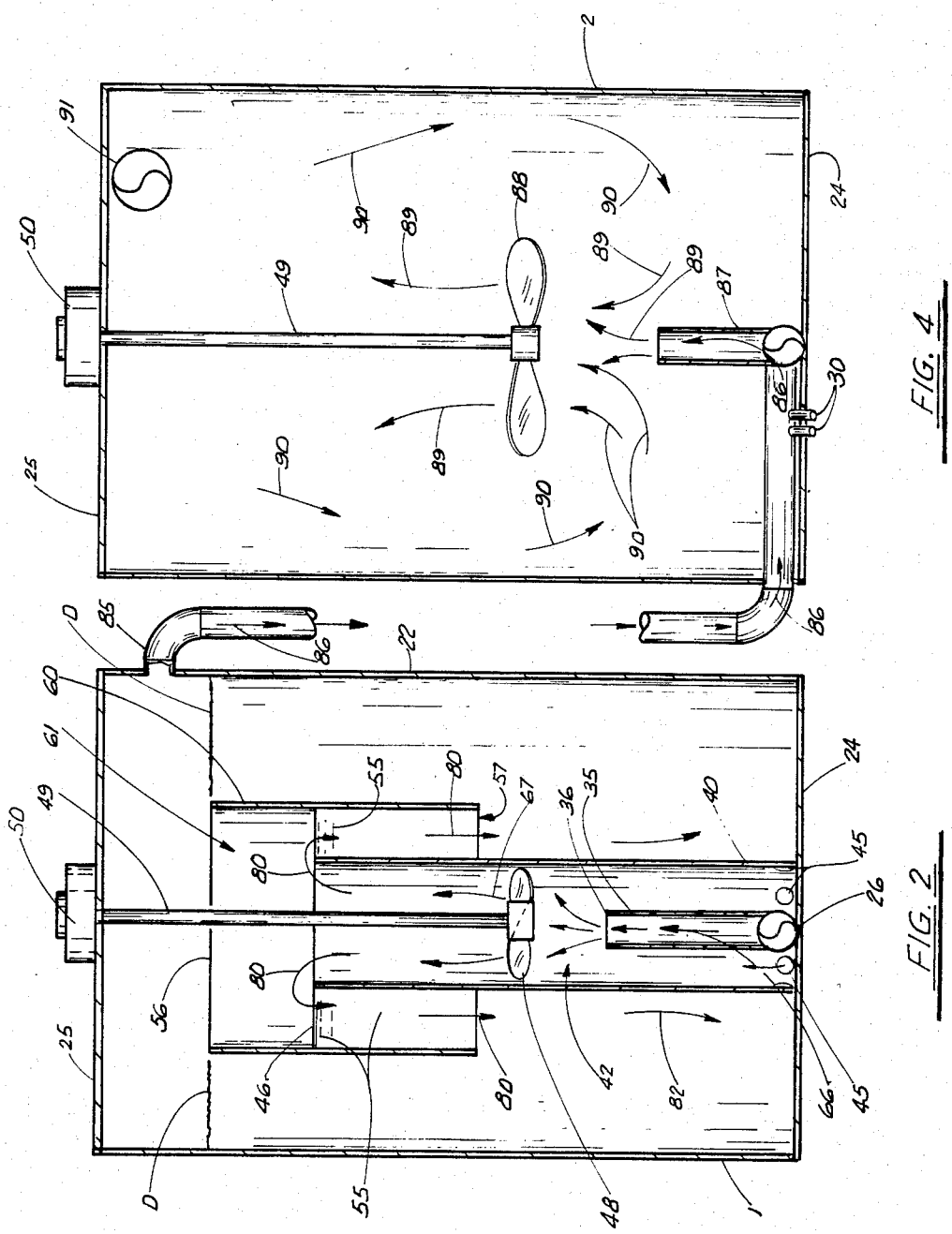
FIG. 2 is a sectional front view of the chemical mixture portion of the preferred embodiment of the apparatus of the present invention.

A floc concentration tube 40 can be seen best in FIGS. 1, 2 and 4. Floc concentration tube 40 is preferably cylindrical providing an inner bore 42 of substantially equal cross-sectional configuration and diameter. The lowermost portion of tube 40 provides a fluid inlet 45 in the form of a plurality of perforations. The upper edge portion of tube 40 forms a fluid outlet 46. Mounted within tube 40 is mixing propeller 48 which is rotatably moved during operation by shaft 49. A suitable motor 50 is also provided for supplying the necessary rotation to shaft 49 and can be mounted as shown in FIG. 2 upon tank top 25. Motor 50 would be any conventional electrical power supply through appropriate electrical conduit.

A plurality of radially spaced ribs 55 mount to the top portion of tube 40 at fluid outlet 46. Shroud 60 provides a cylindrical shroud structure of substantially uniform diameter having upper 56 and lower 57 edges which are above and below respectively fluid outlet of tube 40.

Shroud 60 is preferably of a diameter greater than the diameter of tube 40, while tube 40 is of a diameter greater than that of injection conduit 35. A bore 61 is defined by shroud 60.

Propeller 48 is mounted within tube 40 as above described, below fluid outlet 46 of conduit 45 and above fluid inlet 45 and preferably adjacent and above conduit 35 discharge 36. Arrows 67 indicate the discharge of fluid from conduit 35 adjacent propeller 48.

It should be appreciated that propeller 48 will be rotated at a speed which urges fluid upwardly (as shown by arrows 67 in FIG. 2) at a velocity which urges the fluid a distance above fluid outlet 46 but preferably not above the upper edge 56 of shroud 60. Propeller 48 will be rotated at a speed which propels fluid particles upwardly and into the bore 61 of shroud 60 yet preferably not above the edge 56. (Some floc particles may pass above 56.) In this manner, the arrows 80 of FIG. 2 show the upward and downward path followed by fluid urged upwardly by propeller 48 and discharged at fluid outlet 46 of tube 40. With the use of chemicals to produce a floc, it will be appreciated that floc material will move downwardly towards the bottom 24 of tank one as shown by arrows 82 and be drawn back through perforation 46 of tube 40 upwardly. In this recirculation path, the floc will be built and made heavier as is desirable to remove impurities from the waste stream.

At the upper portion of tank 1, there can be seen a decant line D which represents generally a line above which clear supernatant liquid will collect and be discharged through the draft tube 85 to chemical mixing tank 2. The fluid in draft 85 flows downward as designated by arrows 86 into conduit 87 and then upwards into mixing chamber 2 through conduit 87. Conduit 87 is of sufficient height to allow the fluid to be discharged below propeller 88 of tank 2 that is rotating clockwise and causing an upward draft of the fluid designated by arrows 89. The propeller 88 rotating at speeds controlled by the preferably adjustable speed motor 50 as adjusted by operating personnel causes the fluid to be rolled in mixing chamber 2 and shown by arrows, enabling the floc particles to grow in size for resettling in clarifier settling tank 10. The fluid is discharged as a continuous flow through discharge conduit 85 of tank 2 after desired retention time. The effluent fluid stream enters weir-trough 88 as shown in FIG. 1. In FIG. 1, there can be seen clarifier 100 which is comprised of a plurality of substantially vertical side walls 110 connected together by welding, for example.

Clarifier 100 having inlet weir-trough 88 which can provide, for example, a plurality of V-notches 89 as shown in FIG. 1. Weir-trough 88 is so designed that flow is evenly distributed over the width of clarifier 100. Sections 101, 102 and 103 are seen as comprising clarifier 100. The bottom of clarifier settling section 101 is preferably sloped to the center which is V-shaped to accept the sludge. The angle of repose of the sludge requires that this slope be at an angle to slide the sludge without the use of agitation to the slotted pipe or underdrain 120 for sludge withdrawal to the sludge blow-off tank 401 as shown in FIG. 5. Baffles 130 which can be, for example, a plurality of vertically deposed timber sections 132, provides suitable separators for clarifier settling tanks section 3, 4, and 5. Small spaces 131 will be preferably provided between timber sections 132 so as to allow the passage of some water therethrough in order to keep a constant fluid level, yet form a baffle to discourage short circuiting. This design creates a rolling action of floc to further enhance floc size and deposition of 60% to 70% of the floc solids in primary clarifier settling tank.

Sludge is removed by the use of a blowoff valve through discharge line 125 which communicates with tank 401. The sludge blowoff valves are two inches (2") in size, for example, and are blownoff automatically by a timer.

Water leaving the primary settling tank passes through baffle 130 and to secondary settling tank 102. As before described with respect to subsection 101, subsections 102 and 103 likewise provide a sloping bottom for sludge removal.

At the extreme end portions of clarifier 100 opposite mixing tank 1 and 2, there can be seen effluent weir and weir-trough 201 and 202 respectively and discharging piping 203.

Figure 3:
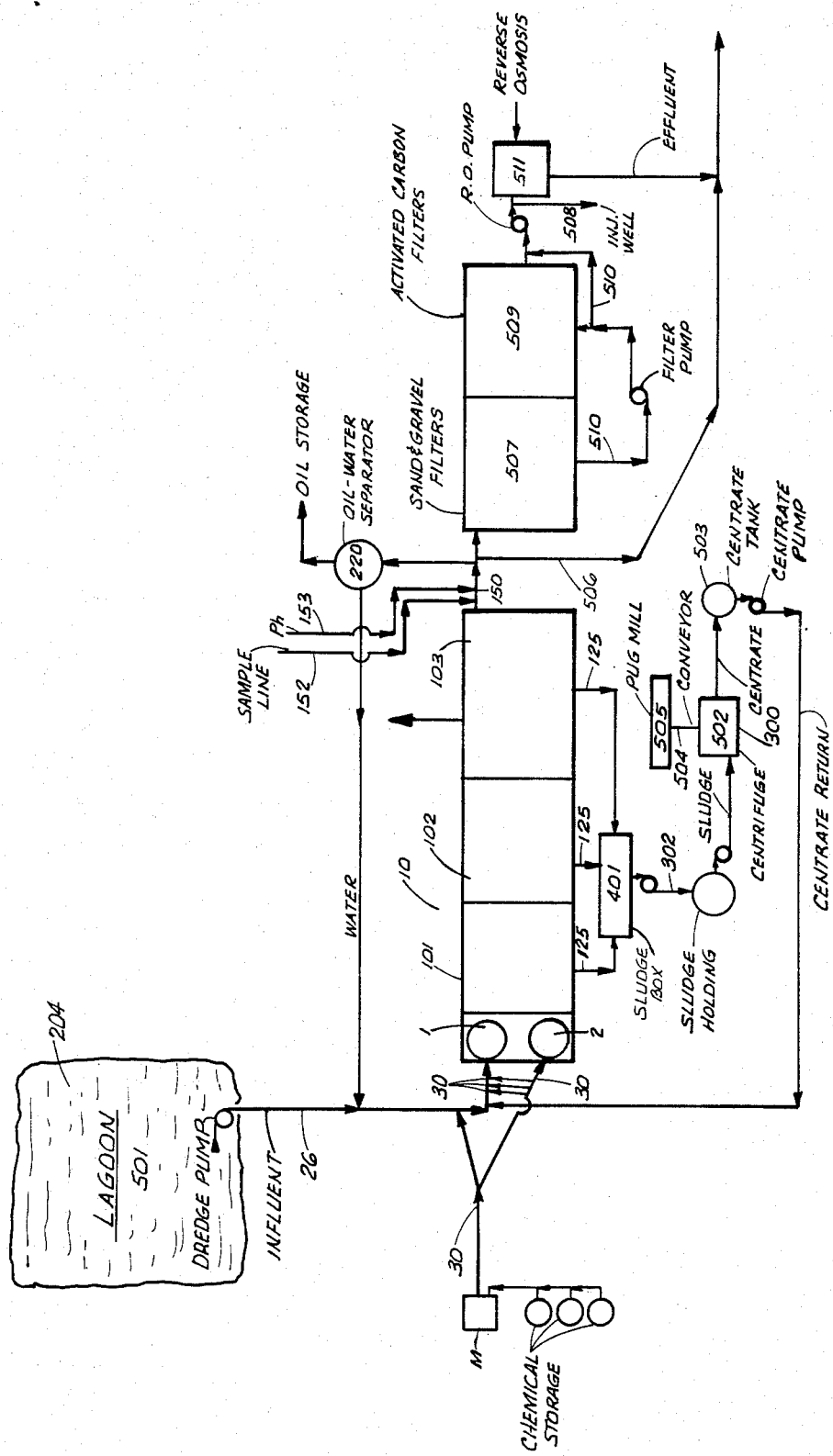
FIG. 3 is a schematic flow diagram of the preferred embodiment of the apparatus of the present invention.

FIG. 3 provides a schematic diagram of the waste treatment of the present invention a preferably used to treat hazardous and non-hazardous lagoons 501, chemical feed 30 is shown as injecting desirable treatment chemicals through the plurality of lines 30 into waste inlet line 26. Chemical injection lines 30 and waste inflow line 26 are both shown also in FIG. 1.

The position of treatment unit 10 as forming part of an overall waste treatment system useful for hazardous waste treatment is seen in FIG. 3. A suitable oil removal unit could be provided as shown in FIG. 3 with oil removal 220 station being schematically illustrated for removing floating oil from treatment unit 10 and returning free water to influent line 26. Sludge discharge lines 125 are schematically illustrated as removing sludge from clarifier settling tanks subsection 101, 102, and 103.

In the removal of sludge from the water stream (as will commonly be the case in the removal of impurities and like solid material from hazardous and non-hazardous lagoons), a sludge dewatering 300 station is shown receiving the waste stream from flow line 302, the station 300 having a centrifuge 502 for water solids separation, a centrate holding tank 503, a conveyer for solids loading 504, and a pug mill 505 for chemical fixation of the solids discharged from the centrifuge.

Discharge line 150 is shown in FIG. 3 from treatment unit 10 in which the water may be discharged directly to the receiving stream through line 506 as a river, ditch, etc. Discharge lines 150 may also be connected to the mobile sand and gravel filters 507 as shown in FIG. 3 for the complete removal of minute suspended solids for underground disposal 508 or to the activated carbon columns 509 for removal of organic and inorganic impurities. The discharge line 510 as shown in FIG. 3 leaving the sand and gravel filters may also be pumped to the Reverse Osmosic 511 Unit for chloride, organic and inorganic removal of the fluid discharge to the receiving body of water. Lines 152, 153 designate respectively sampling line and pH monitor lines.

Because many varying and different embodiments may be made within the scope of the inventive concept herein taught, and because many modifications may be made in the embodiments herein detailed in accordance with the descriptive requirements of the law, it is to be understood that the details are to be interpreted as illustrative and not in a limited sense.

What is claimed as invention is:

1. A self-contained transportable waste treatment apparatus comprising:
   a. an elongated, transportable, structural sled;
   b. a pair of mixing tanks mounted at one end of the sled for mixing a liquid volume contained therein, at least one of the mixing tanks having a flow inlet discharging into the bottom thereof, a hollow tube disposed vertically within the tank and surrounding the inlet, and means for circulating fluid into the tube so that it discharges from the top of the tube and then circulates around the outside of the tube in a direction which returns the fluid into the bottom of the tube to an area adjacent said inlet;
   c. means for supplying a waste stream containing a chemical enhancing the formation of floc to the mixing tanks through said flow inlet;
   d. a generally rectangular settling tank supported on the sled and defined by a plurality of walls extending up from the peripheral edge portion of the sled;
   e. conduit means connecting the mixing tanks with the settling tank for supplying supernatant liquid from the mixing tanks to the settling tank;
   f. means within the mixing tanks for recirculating fluid within the mixing tank;
   g. a plurality of vertically disposed sections with small spaces therebetween forming a baffle structure extending from the top to the bottom of said settling tank that is placed interiorly of the settling tank and generally transversely placed to the direction of flow through the settling tank and dividing the settling tank into at least primary and secondary sectors, said spaces allowing fluid flow therethrough and between the primary and secondary sectors to maintain a constant fluid level in said settling tank while enhancing floc size and solids deposition; and
   h. multiple sludge drawoff means supported by the sled and including multiple sections disposed at the lower portion of the settling tank respectively in the primary and secondary sectors thereof, each sector thereof being formed by two planar surfaces sloped toward the mid portion of each sector, and the upper portion of each planar surface intersecting respectively a side wall of that sector and a baffle, the lower portions of each planar surface communicating with a drain channel for removing settled solid material from the primary and from the secondary sectors of the settling basin in a lateral direction with respect to the direction of flow of fluid through the settling tank.

* * * * *